United States Patent
Sultenfuss et al.

(10) Patent No.: US 10,033,087 B2
(45) Date of Patent: Jul. 24, 2018

(54) ARTICULATING INFORMATION HANDLING SYSTEM HOUSING WIRELESS NETWORK ANTENNAE SUPPORTING BEAMFORMING

(71) Applicant: Dell Products L.P., Round Rock, TX (US)

(72) Inventors: Andrew T. Sultenfuss, Leander, TX (US); Bruce C. Montag, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1131 days.

(21) Appl. No.: 13/747,696

(22) Filed: Jan. 23, 2013

(65) Prior Publication Data

US 2014/0203966 A1 Jul. 24, 2014

(51) Int. Cl.
  *H01Q 1/22* (2006.01)
  *H01Q 3/24* (2006.01)
  *H04B 7/06* (2006.01)

(52) U.S. Cl.
  CPC ............. *H01Q 1/2266* (2013.01); *H01Q 3/24* (2013.01); *H04B 7/0602* (2013.01)

(58) Field of Classification Search
  CPC ...... H01Q 1/2266; H01Q 3/24; H04B 7/0602; G06F 1/1677; E05D 11/02
  See application file for complete search history.

(56) References Cited

U.S. PATENT DOCUMENTS

| | | | |
|---|---|---|---|
| 8,260,360 B2 | 9/2012 | Rofougaran et al. | |
| 8,654,030 B1 * | 2/2014 | Mercer | H04B 1/3833 343/702 |
| 2001/0052878 A1 * | 12/2001 | Kim | G06F 1/1616 343/702 |
| 2003/0069717 A1 * | 4/2003 | Havelock | H01Q 3/24 702/191 |
| 2003/0112588 A1 * | 6/2003 | Shimano | G06F 1/1616 361/679.06 |

(Continued)

FOREIGN PATENT DOCUMENTS

EP 1079296 A2 2/2001

OTHER PUBLICATIONS

Distal. (1992). C. Morris (Ed.), Academic Press Dictionary of Science and Technology. Oxford, United Kingdom: Elsevier Science & Technology. Retrieved from http://search.credoreference.com/content/entry/apdst/distal/0.*

Distal. (2011). The American Heritage Dictionary of the English Language. Boston, MA: Houghton Mifflin. Retrieved from http://search.credoreference.com/content/entry/hmdictenglang/distal/0.*

(Continued)

*Primary Examiner* — Bernarr E Gregory
*Assistant Examiner* — Fred H Mull
(74) *Attorney, Agent, or Firm* — Zagorin Cave LLP; Robert W. Holland

(57) ABSTRACT

First and second antenna disposed in an information handling system selectively support communication through a wireless frequency using beamforming. The first or second antenna is selected for initiating communication based upon alignment with a beamforming axis for establishing beamforming with a distal wireless device. For example, the first antenna is selected if the information handling system articulates to a tablet configuration and the second antenna is selected if the information handling system articulates to a clamshell open configuration.

20 Claims, 3 Drawing Sheets

(56) References Cited

U.S. PATENT DOCUMENTS

| | | | | |
|---|---|---|---|---|
| 2003/0159248 | A1* | 8/2003 | Gulley | E05D 11/02 16/273 |
| 2006/0245512 | A1* | 11/2006 | Rha | H04B 7/0617 375/267 |
| 2007/0226734 | A1* | 9/2007 | Lin | G06F 9/44526 717/177 |
| 2009/0244012 | A1* | 10/2009 | Behar | G06F 1/1677 345/169 |
| 2009/0295648 | A1* | 12/2009 | Dorsey | H01Q 1/2266 343/702 |
| 2012/0054401 | A1* | 3/2012 | Cheng | G06F 1/1632 710/304 |
| 2012/0264387 | A1 | 10/2012 | Rofougaran et al. | |
| 2013/0321216 | A1* | 12/2013 | Jervis | G06F 1/1616 343/702 |
| 2013/0344907 | A1* | 12/2013 | Pan | H01Q 1/2266 455/500 |
| 2014/0003622 | A1* | 1/2014 | Ikizyan | H04R 3/00 381/95 |

OTHER PUBLICATIONS

Firmware. (2001). Hargrave's Communications Dictionary, Hoboken, NJ: Wiley. Retrieved from http://search.credoreference.com/content/entry/hargravecomms/firmware/0.*

Firmware. (2010). Dictionary of Computing. London, United Kingdom: Bloomsbury. Retrieved from http://search.credoreference.com/content/entry/acbcomp/firmware/0.*

Mux. (2010). Dictionary of Computing. London, United Kingdom: Bloomsbury. Retrieved from http://search.credoreference.com/content/entry/acbcomp/mux/0.*

Multiplexer or multiplexor. (2014). In Collins Collins English Dictionary. London, United Kingdom: Collins. Retrieved from http://search.credoreference.com/content/entry/hcengdict/multiplexer_or_multiplexor/0.*

J. Tyson et al., How Computer Keyboards Work, HowStuffWorks.com, http://computer.howstuffworks.com/keyboard.htm, Nov. 2000.*

I. Poole, MIMO Antenna Beamforming, http://www.radio-electronics.com/info/antennas/mimo/antenna-beamforming.php, Nov. 2010.*

* cited by examiner

… (1)

ARTICULATING INFORMATION HANDLING SYSTEM HOUSING WIRELESS NETWORK ANTENNAE SUPPORTING BEAMFORMING

BACKGROUND OF THE INVENTION

Field of the Invention

The present invention relates in general to the field of information handling system wireless communication, and more particularly to an articulating information handling system housing wireless network antenna supporting beam forming.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. Although conventional clamshell configurations provide ease of use and convenience, when the lid is free to rotate relative to the main chassis portion, the display supported by the lid generally does not offer a firm enough platform for accepting touchscreen inputs. For this and other reasons, "convertible" portable information handling systems include a touchscreen display in an articulating lid to generally provide rotation to a tablet-type of configuration in which the lid is supported by the main chassis portion to remain stationary during touch interfaces. For example, one option is to rotate the lid from the closed position for 360 degrees about a horizontal axis so that the display is exposed like a tablet and resting against the bottom surface of the main chassis portion. Another option is to rotate the lid 90 degrees about a horizontal axis to a conventional clamshell open position, then rotate the lid 180 degrees about a vertical axis so that the lid then rotates about the horizontal axis to the closed position with the display facing outward. Other options include the use of a support frame in the lid with a display that flips around within the support frame to provide a tablet mode.

One factor that has increased the acceptance by end users of portable information handling systems is the ability of wireless network interfaces to provide communication for portable systems so that awkward wired connections are not necessary for normal system use. Recent advances reflected by the Wireless Gigabit Alliance (WiGig) specification provide multi-gigabit speed wireless communications through the unlicensed 60 GHz frequency band. WiGig tri-band enabled devices, which operate in the 2.4, 5 and 60 GHz bands, deliver data transfer rates of up to 7 Gbits/s while maintaining compatibility with existing Wi-Fi devices, such as 802.11n devices. Communication through the 60 GHz band provides rapid data transfers that support interfaces with peripheral devices such as displays and high definition televisions. Although the 60 GHz band provides high data transfer rates relative to the lower frequency 2.4 and 5 GHz bands, the effective range for communication at the higher 60 GHz frequency is substantially less than the lower frequencies. In order to obtain adequate effective communication at distances of 10 meters or greater, WiGig supports beamforming in the 60 GHz band, which moves beams of radio communication within the coverage area through modification of the transmission phase of individual antenna elements, known generally as phase array antenna beamforming. To establish communication with beamforming, the antenna array disposed in an information handling system generally has to direct communications towards a target antenna in line-of-sight of the front face of the antenna array.

SUMMARY OF THE INVENTION

Therefore a need has arisen for a system and method which supports beamforming for wireless communication at an information handling system having an articulated chassis.

In accordance with the present invention, a system and method are provided which substantially reduce the disadvantages and problems associated with previous methods and systems for wireless communication by a portable information handling system having an articulated chassis. Plural antennae interface with a wireless networking device to provide alignment of at least one antenna with a beamforming axis at plural articulated chassis configurations, such as a tablet configuration and a clamshell open configuration. Beamforming wireless communication with distal devices is initiated from a selected of the plural antennae based in part upon the articulated chassis configuration.

More specifically, an information handling system has processing components disposed in an articulated housing for presenting visual information as images. For example, a processor and memory disposed in a main housing portion generate information for presentation by a display disposed in a display housing portion. The main and display housing portions articulate relative to each other to move between plural configurations, such as a tablet configuration and a clamshell open configuration. A wireless networking device disposed in the information handling system selectively communicates through a frequency band with a selected of plural antennae to establish beamforming with a distal wireless networking device, such as a display. Selection of an antenna to initiate beamforming is made by analysis of the information handling system, such as the configuration of display and main housing portions relative to each other. For example, each of first and second antenna disposed in a barrel hinge enclosure align with a beamforming axis based upon the configuration of display and main housing portions as a tablet or open configuration.

The present invention provides a number of important technical advantages. One example of an important technical advantage is that wireless network communication by an information handling system having an articulated chassis is supported with beamforming, such as to support 60 GHz WiGig communications. Selection of an antenna array to initiate a scan in the 60 GHz range is based upon the articulated configuration of the information handling system housing so that beamforming is established in a more rapid manner. For instance, a mechanical switch activated by hinge articulation aids selection of an antenna array for more rapid beamforming by indicating which of plural antenna arrays has less physical obstruction at the housing with respect to line of sight with an anticipated target antenna. Alternatively, electronic signals that provide information about articulated housing configurations provide a basis for antenna selection. Thus, end users achieve more rapid and strong beamforming communications in the 60 Ghz band or similar communication bands.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selecting an antenna from plural antennae to establish beamforming wireless communication based upon an information handling system housing configuration provides a more rapid and robust wireless interface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
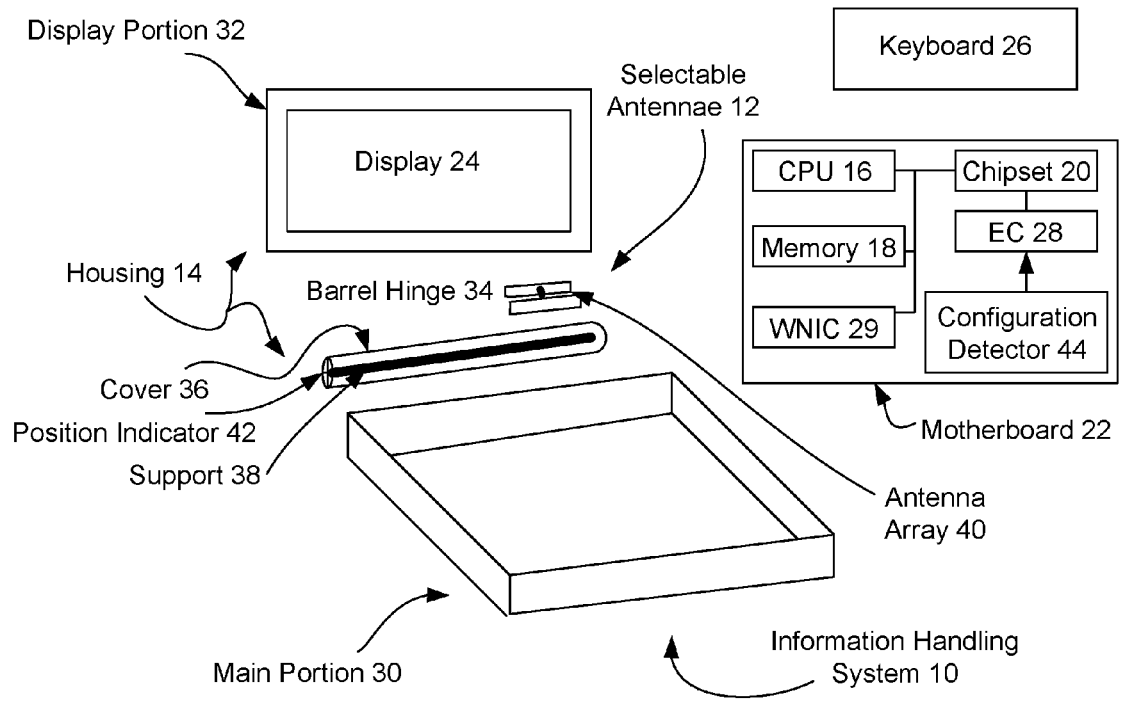
FIG. 1 depicts a blow-up view of a portable information handling system having selectable antennae to establish network communications with beamforming.

Referring now to FIG. 1, a blow-up view depicts a portable information handling system 10 having selectable antennae 12 to establish network communications with beamforming. Information handling system 10 processes information with components disposed in a housing 14, such as a processor 16, memory 18, and chipset 20 interfaced through a motherboard 22. For example, an operating system executing on processor 16 and stored in memory 18 supports execution of applications on processor 16 having interactions with hardware components managed by firmware executing on chipset 20. For instance, chipset 20 includes graphics components that process information for presentation as visual images at a display 24. A keyboard 26 accepts end user inputs for processing by an embedded controller 28, also known as a keyboard controller, which communicates inputs to processor 16. A wireless network interface card (WNIC) 29 interfaced with chipset 20 and embedded controller 28 includes a wireless communication device that establishes communication with external wireless devices distal information handling system 10, such as with WiGig standard signals sent and received through one or more selected of plural antennae 12. In alternative embodiments, alternative types and arrangements of components may be used to process information.

Housing 14 of information handling system 10 has a main portion 30 that supports motherboard 22 and a display portion 32 that supports display 24. Housing main portion 30 articulates relative to housing display portion 32 with an articulation device, such as the barrel hinge 34 depicted in the example embodiment of FIG. 1. For example, information handling system 10 is a convertible system that rotates display portion 32 relative to main portion 30 from a closed position that hides display 24, to an open position having display 24 generally perpendicular to main portion 30 and a tablet position having display 24 exposed generally parallel to main portion 30. In alternative embodiments, alternative types of articulation devices move housing display and main portions 32 and 30 relative to each other to achieve plural configurations, such as open and tablet configurations. For instance, various types of convertible information handling systems may be used, such as systems that rotate a display portion in an open configuration to close the display over the main portion with the display visible in a tablet configuration. Alternatively, the display portion has a frame that allows the display to rotate 180 degrees within the frame so that closing the frame provides a tablet configuration.

In the example embodiment of FIG. 1, barrel hinge 34 couples to housing main portion 30 and housing display portion 32 to allow rotational movement of the main and display portions relative to each other. An outer cover 36 couples to display portion 32 and rotates about an inner support 38 that couples to main portion 30. Selectable antennae 12 include first and second opposing antenna arrays 40 that face in substantially opposite directions. Each antenna array 40 faces outward from support 38 to provide beamforming wireless communication, such as to communicate in the 60 GHz frequency band according to the WiGig standard. Selectable antennae 12 move with cover 36 so that each antenna array 40 points in the same direction relative to display portion 32 as display portion 32 rotates relative to main portion 30, but in a different direction relative to main portion 30. Cover 36 encloses selectable antennae 12 using a material that does not interfere with radio communications, such as a plastic material. A position indicator 42 measures the relative position of cover portion 36 and support portion 38 in order to provide information regarding the configuration of housing main and display portions 30 and 32, and thus the direction in which each antenna array 40 points. For instance, an electrical signal that passes between cover portion 36 and support 38 is decoded by a configuration detector 44 executing as firmware on embedded controller 44. Configuration detector 44 selects the antenna array 40 to initiate beamforming communication by determining which of the antenna arrays 40 is pointed most directly at a likely beamforming target, such as a wireless display or other wireless device.

Figure 2:
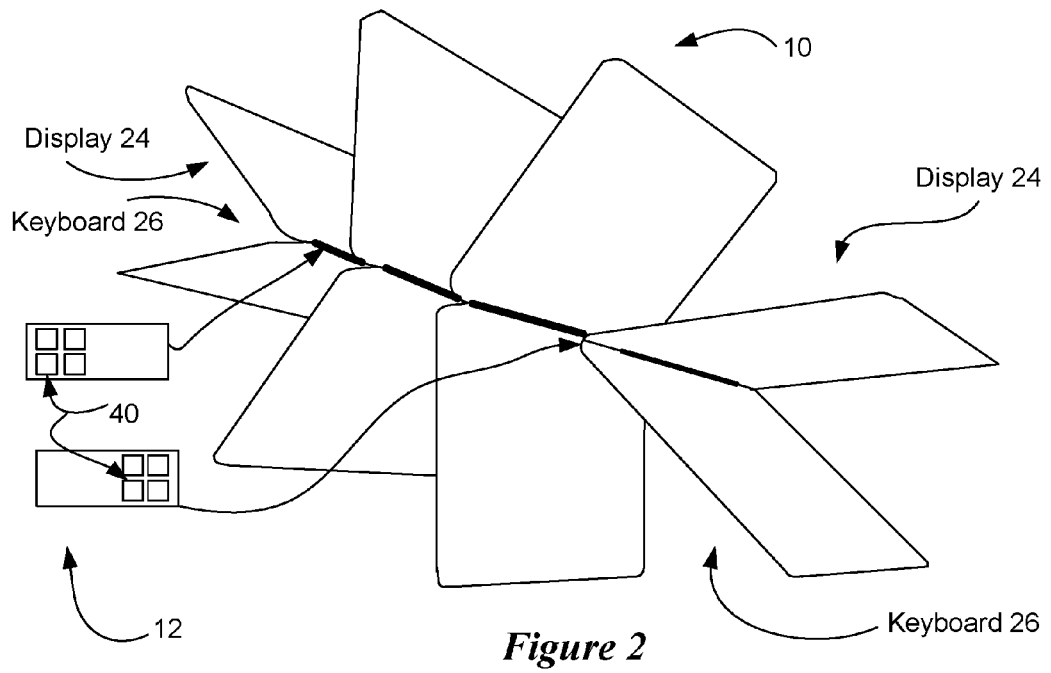
FIG. 2 depicts an example of motion of display and main portions of an information handling system housing relative to each other and a beamforming axis.

Referring now to FIG. 2, an example is depicted of motion of display and main portions 32 and 30 of an information handling system housing 14 relative to each other and a beamforming axis 46. In the example embodiment, each antenna array 40 of selectable antenna 12 faces a direction substantially perpendicular with display portion 32 as display portion 32 rotates relative to housing main portion 30. Beamforming axis 46 is directed toward a distal wireless device that communicates with information handling system 10, such as wireless peripheral devices that present images like an LCD. In alternative embodiments, alternative orientations of varying numbers of antenna arrays 40 may provide communication along one or more selected of plural beamforming axes. For example, an antenna might align with a docking station in a closed position so that a beamforming axis is established towards an antenna array of the docking station.

Figure 3:
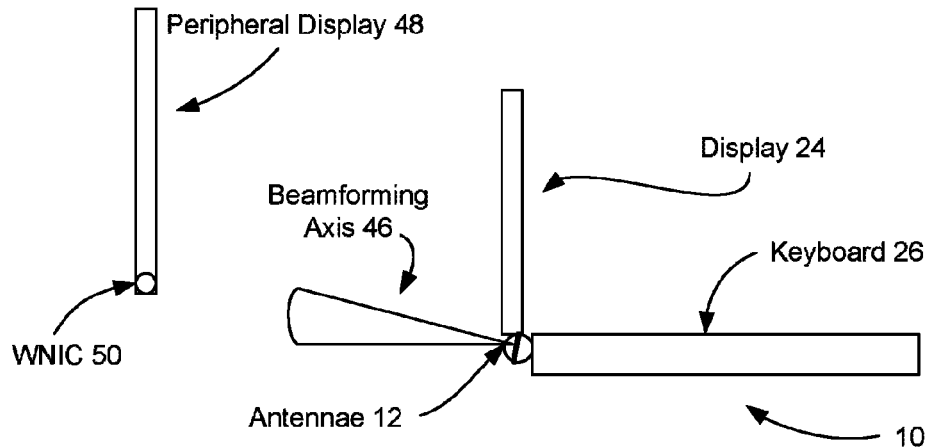
FIG. 3 depicts a side view of an information handling system in an open clamshell configuration having an antenna aligned with a beamforming axis.

Referring now to FIG. 3, a side view depicts an information handling system 10 in an open clamshell configuration having an antenna 12 aligned with a beamforming axis 46. The selectable antenna 12 includes an antenna array 40 disposed to align with beamforming axis 46 when an end user has opened display portion 32 to a position substantially perpendicular with main portion 30. Configuration detector 44 detects the clamshell open configuration so that the antenna array 40 aligned with beamforming axis 46 will attempt to initiate beamforming communication before other antenna arrays, such as an antenna array aligned in an opposing direction towards housing main portion 30. Attempting to initiate communication with an antenna array that aligns with beamforming axis 46 ensures more rapid establishment of communication by beamforming. An antenna array that directs a beam through housing main portion 30 will have limited range due to interference caused by the material within main portion 30. Thus configuration detector 44 provides for initiation of beamforming with an antenna array having an increased likelihood of establishing communication with a target wireless device 48, such as a peripheral display having a WiGig WNIC 50. In alternative embodiments, alternative indications of configurations may be used, such as detection of display portion 32 in proximity with main portion 30 using magnets, reed switches, Hall effect switches etc. . . . . In one example embodiment, to determine the position of an antenna array 40 relative to housing main portion 30, a signal is sent from the antenna array and analyzed for reflection and or scattering against housing main portion 30 or other affects indicative of transmission through housing main portion 30.

Figure 4:
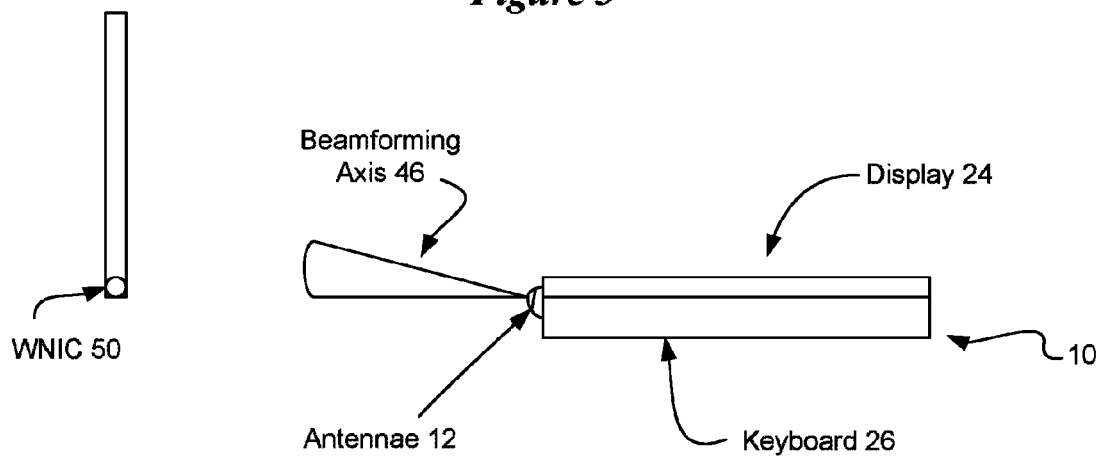
FIG. 4 depicts a side view of an information handling system in a tablet configuration having an antenna aligned with a beamforming axis.

Referring now to FIG. 4, a side view depicts an information handling system 10 in a tablet configuration having an antenna aligned with a beamforming axis 46. Display portion 32 of housing 12 rotates about barrel hinge 34 to a position substantially parallel so that display 24 is presented as if it is a tablet display. Selectable antennae 12 rotate with display portion 32 so that the antenna array 40 that aligned with beamforming axis 46 in the open configuration depicted by FIG. 3 now aligns towards housing main portion 30 and the opposing antenna array 40 now aligns with beamforming axis 46. An end user can vary the orientation of the tablet to further align the exposed antenna array that is not directed into housing main portion 30 so that the antenna array is directed towards a desired peripheral device, such as a secondary display or a keyboard having 60 GHz WiGig support.

Figure 5:
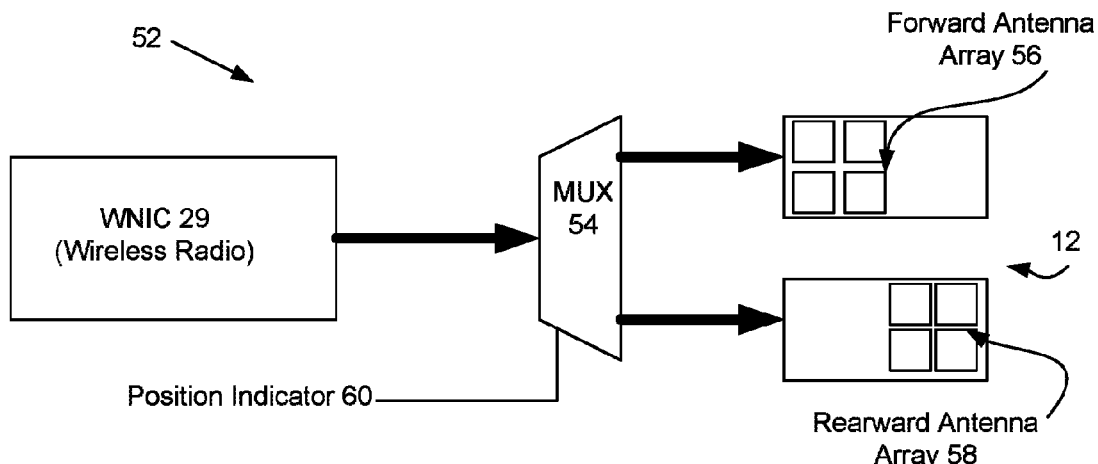
FIG. 5 depicts an example of a circuit that selects an antenna from plural antennae for initiating beamforming network communication.

Referring now to FIG. 5, an example is depicted of a circuit 52 that selects an antenna 40 from plural antennae for initiating beamforming network communication. A multiplexor 54 interfaces a WNIC 29 to a forward facing antenna array 56 and a rearward facing antenna array 58. WNIC 29 has radio communications hardware for communicating with WiGig devices through the 60 GHz frequency band. As an example, forward facing antenna array 56 supports 60 GHz beamforming communication along a beamforming axis 46 when information handling system 10 has the tablet configuration as depicted by FIG. 4 and rearward facing antenna array 58 supports 60 GHz beamforming communication along a beamforming axis 46 when information handling system 10 is in the clamshell open configuration as depicted by FIG. 3. A position indicator input 60 to multiplexor 54 selects which of antenna array 56 or 58 to interface with WNIC 29 based upon the relative position of display portion 32 and main portion 30 of housing 14. For example, an indication to use a tablet configuration may be provided once display portion 32 rotates greater than 180 degrees relative to main portion 30. In alternative embodiments, alternative relative positions may be used to indicate a switch between antenna arrays for initiation of beamforming communication.

Figure 6:
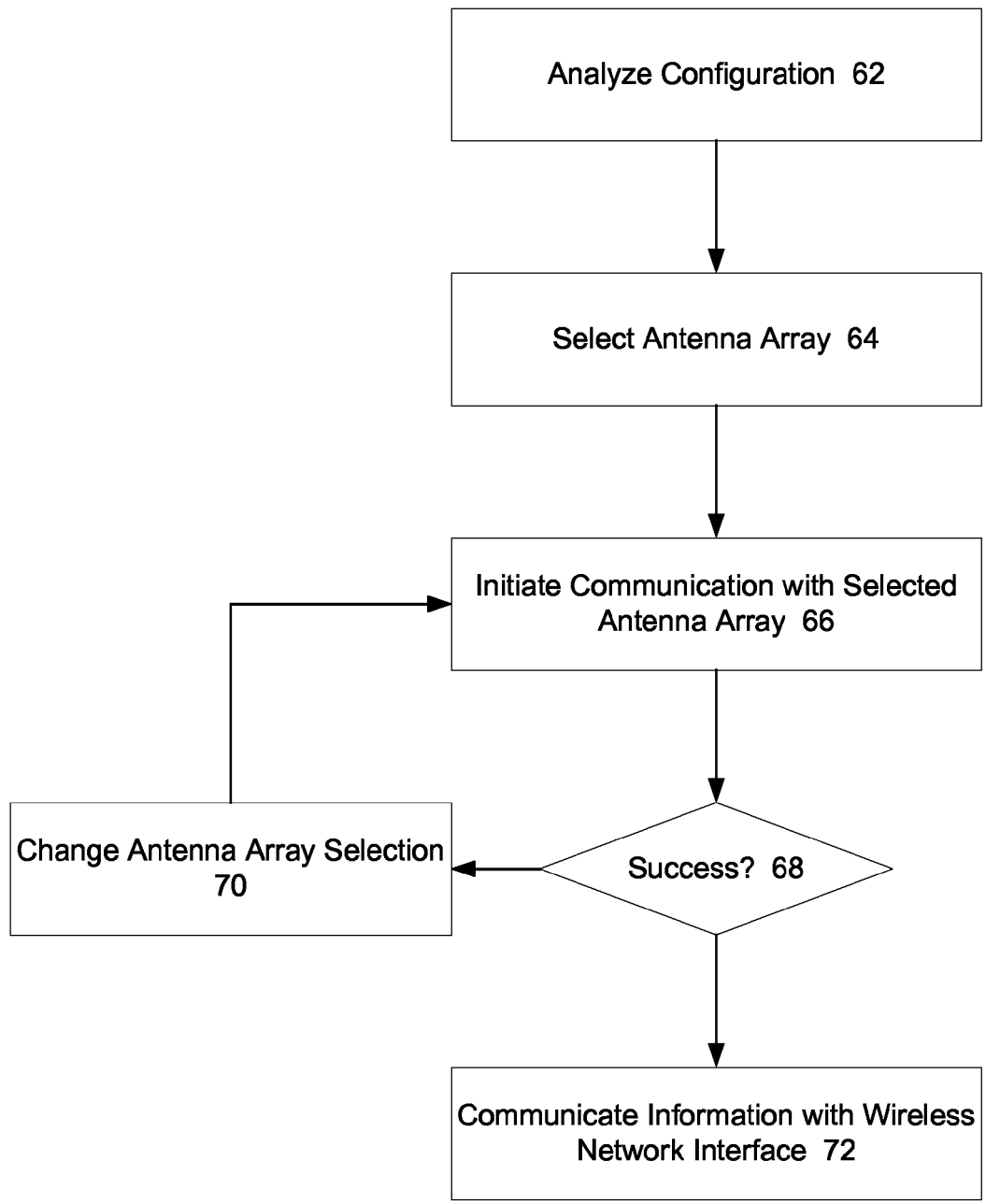
FIG. 6 depicts a flow diagram of a process for establishing wireless networking communication with a selected of plural antennae.

Referring now to FIG. 6, a flow diagram depicts a process for establishing wireless networking communication with a selected of plural antennae. The process begins at step 62 with analysis of operating conditions at an information handling system that affect beamforming communications, such as the relative position of articulating housing portions to each other. At step 64, one or more of plural antennae are selected to establish beamforming communication based upon the analysis. For example, a first antenna is selected if the housing portions have a tablet configuration and a second antenna is selected if the housing portions have an open configuration. At step 66, beamforming communication is initiated with the selected antenna, such as by performing a beamforming scan for target devices. At step 68 a determination is made of whether the initiation of beamforming established a successful wireless connection. If not, the process continues to step 70 to switch to a different antenna, and step 66 to initiate beamforming communication with the different antenna. If at step 68 beamforming established a successful wireless interface, the process continues to step 72 to communicate wireless information using the established beamforming communication.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a main portion and a display portion;
a hinge coupled to the main portion and display portion and operable to position the main portion and display portion relative to each other in at least a tablet configuration and an open configuration;
a processor disposed in the main portion and operable to process information;
a display disposed in the display portion and operable to present information as visual images;
a wireless network device disposed in the housing and interfaced with the processor, the wireless network device operable to support wireless network communication with a wireless network device separated by a distance;
first and second antennae interfaced with the wireless network device and operable to establish wireless communication with the wireless network device separated by a distance using beamforming along a beamforming axis, the first antenna aligned along a first axis, the second antenna aligned along a second axis, the first axis aligned with the beamforming axis in the tablet configuration, the second axis aligned with the beamforming axis in the open configuration, the wireless network device communicating through the first or second antenna based at least in part upon whether the beamforming axis of the first or second antenna passes through the main portion.

2. The information handling system of claim 1 wherein the first and second antennae couple to the hinge at first and second locations so that the first axis is directed away from the main housing portion in the tablet configuration and the second axis is directed away from the main housing portion in the open configuration.

3. The information handling system of claim 1 further comprising:
a configuration detector firmware module executing on a controller and operable to detect the tablet configuration and the open configuration to initiate beamforming at the first antenna in response to configuration detector detection of the tablet configuration and to initiate beamforming at the second antenna in response to configuration detector detection of the open configuration.

4. The information handling system of claim 3 further comprising a multiplexor, the configuration detector module interfacing with the multiplexor, the multiplexor having an output to the wireless network device, the multiplexor output commanding initiation of beamforming with the first antenna if the hinge is in a first position and with the second antenna if the hinge is in a second position.

5. The information handling system of claim 1 wherein the hinge comprises a barrel hinge having first and second rotationally coupled portions, the first portion coupled to the housing main portion and the second portion coupled to the housing display portion, the first and second antennae coupled to the barrel hinge second portion to rotate with the housing display portion relative to the housing main portion.

6. The information handling system of claim 5 wherein the first and second antennae are enclosed by the barrel hinge first portion.

7. The information handling system of claim 6 wherein the housing main portion has an upper side with a keyboard and a lower side, and wherein the open configuration aligns the display substantially perpendicular with the upper side and the tablet configuration aligns the display substantially parallel with the lower side.

8. The information handling system of claim 7 wherein the wireless network device comprises a 60 GHz device.

9. The information handling system of claim 8 wherein the wireless network device separated by a distance comprises a display operable to present visual images from information communicated with beamforming.

10. A method for communicating between an information handling system and a wireless device, the method comprising:
detecting a housing configuration of the information handling system, the housing configuration having at least a position of a housing display portion relative to a housing main portion; and
in response to the detected housing configuration, initiating communication between a wireless network device disposed in the housing and a wireless network device separated by a distance from the housing, the initiating communication performed through a selected of a first or second antenna, the first or second antenna selected at least in part based upon the detected housing configuration, the housing configuration including at least first and second relative positions of the display and main portions, the wireless network device communicating through a first directional antenna or a second directional antenna, the selection of the first or second antenna based at least in part on a transmission direction of each of the first and second directional antenna relative to the housing display portion and the housing main portion.

11. The method of claim 10 further comprising:
moving the housing display portion relative to the housing main portion with a hinge, the housing display portion and housing main portion moved between at least a tablet configuration and an open configuration;
aligning the first directional antenna with a beamforming axis in the tablet configuration; and
initiating communication with the first directional antenna if detecting the housing configuration detects the tablet configuration.

12. The method of claim 11 wherein aligning the first directional antenna with a beamforming axis automatically correlates to moving the housing display and main portions to the tablet configuration.

13. The method of claim 11 further comprising:
aligning the second directional antenna with the beamforming axis in the open configuration; and
initiating communication with the second directional antenna if detecting the housing configuration detects the open configuration.

14. The method of claim 13 wherein aligning the second directional antenna with the beamforming axis automatically correlates to moving the housing display and main portions to the open configuration.

15. The method of claim 11 wherein the hinge comprises a barrel hinge coupled to the housing main and display portions, the barrel hinge enclosing the first and second antennae and moving the first and second antennae with the housing display portion as the display portion moves relative to the housing main portion.

16. The method of claim 10 wherein detecting a housing configuration further comprises activating a signal to a multiplexor upon detection of a tablet configuration, the multiplexor initiating beamforming with a selected of the first and second antennae associated with the tablet configuration.

17. A method for communication through a frequency band with an information handling system, the method comprising:
  disposing first and second directional antennae at an information handling system housing, the first and second directional antennae communicating through the same frequency band, the first directional antenna communicating along a first axis, the second directional antenna communicating along a second axis different from the first axis;
  analyzing at the information handling system to determine whether the first or second directional antennae faces towards a wireless network device separated by a distance based at least in part on a configuration of the information handling system housing; and
  initiating communication between the determined of the first or second directional antennae and the wireless network device separated by a distance with beamforming.

18. The method of claim 17 wherein analyzing at the information handling system further comprises:
  determining a relative position between a first housing portion and a second housing portion of the information handling system; and
  selecting the first or second directional antenna based upon the relative position, the selecting including selection of the first or second antenna that does not communicate along an axis passing through the information handling system housing.

19. The method of claim 17 wherein the frequency band comprises 60 GHz.

20. The method of claim 17 wherein the wireless network device separate by a distance comprises a display operable to present visual images with information wirelessly communicated from the information handling system through the frequency band.

* * * * *